US010558418B2

(12) United States Patent
Dutu et al.

(10) Patent No.: US 10,558,418 B2
(45) Date of Patent: Feb. 11, 2020

(54) MONITOR SUPPORT ON ACCELERATED PROCESSING DEVICE

(71) Applicant: Advanced Micro Devices, Inc., Sunnyvale, CA (US)

(72) Inventors: Alexandru Dutu, Bellevue, WA (US); Bradford M. Beckmann, Bellevue, WA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 204 days.

(21) Appl. No.: 15/661,843

(22) Filed: Jul. 27, 2017

(65) Prior Publication Data

US 2019/0034151 A1    Jan. 31, 2019

(51) Int. Cl.
*G06T 1/20*   (2006.01)
*G06F 9/38*   (2018.01)
*G06F 3/14*   (2006.01)

(52) U.S. Cl.
CPC .......... *G06F 3/1431* (2013.01); *G06F 9/3855* (2013.01); *G06T 1/20* (2013.01)

(58) Field of Classification Search
None
See application file for complete search history.

(56) References Cited

U.S. PATENT DOCUMENTS

| 5,021,945 | A | * | 6/1991 | Morrison | ................. | G06F 8/445 |
| | | | | | | 712/216 |
| 10,043,232 | B1 | * | 8/2018 | Ramadoss | ................. | G06T 1/20 |
| 10,186,007 | B2 | * | 1/2019 | Barik | ......................... | G06T 1/20 |
| 10,255,106 | B2 | * | 4/2019 | Farazmand | ........... | G06F 9/5027 |
| 2007/0180438 | A1 | * | 8/2007 | Suba | ...................... | G06F 8/4441 |
| | | | | | | 717/151 |
| 2012/0291040 | A1 | * | 11/2012 | Breternitz | ............. | G06F 9/5083 |
| | | | | | | 718/104 |
| 2013/0147816 | A1 | * | 6/2013 | Hartog | ..................... | G06F 9/505 |
| | | | | | | 345/503 |

(Continued)

OTHER PUBLICATIONS

Hoare, C. A. R., "Monitors: An Operating System Structuring Concept", Communications of the ACM, Oct. 1974, pp. 549-557, vol. 17, Issue 10, ACM, New York, NY, USA.

(Continued)

*Primary Examiner* — Isaac T Tecklu
(74) *Attorney, Agent, or Firm* — Volpe and Koenig, P.C.

(57) ABSTRACT

A technique for implementing synchronization monitors on an accelerated processing device ("APD") is provided. Work on an APD includes workgroups that include one or more wavefronts. All wavefronts of a workgroup execute on a single compute unit. A monitor is a synchronization construct that allows workgroups to stall until a particular condition is met. Responsive to all wavefronts of a workgroup executing a wait instruction, the monitor coordinator records the workgroup in an "entry queue." The workgroup begins saving its state to a general APD memory and, when such saving is complete, the monitor coordinator moves the workgroup to a "condition queue." When the condition specified by the wait instruction is met, the monitor coordinator moves the workgroup to a "ready queue," and, when sufficient resources are available on a compute unit, the APD schedules the ready workgroup for execution on a compute unit.

20 Claims, 7 Drawing Sheets

(56) References Cited

U.S. PATENT DOCUMENTS

| | | | | |
|---|---|---|---|---|
| 2013/0155077 A1* | 6/2013 | Hartog | | G06F 9/3851 345/506 |
| 2013/0160017 A1* | 6/2013 | Hartog | | G06F 9/4881 718/103 |
| 2013/0185725 A1* | 7/2013 | Abdalla | | G06F 9/505 718/102 |
| 2013/0185728 A1* | 7/2013 | Abdalla | | G06F 9/4881 718/103 |
| 2013/0262776 A1* | 10/2013 | Asaro | | G06F 12/0835 711/135 |
| 2014/0149710 A1* | 5/2014 | Rogers | | G06F 9/3851 711/170 |
| 2014/0258693 A1* | 9/2014 | Lindholm | | G06F 9/38 712/233 |
| 2014/0282566 A1* | 9/2014 | Lindholm | | G06F 9/522 718/102 |
| 2014/0373028 A1* | 12/2014 | Lyashevsky | | G06F 11/00 718/106 |
| 2015/0135182 A1* | 5/2015 | Liland | | G06F 9/3867 718/102 |
| 2016/0055005 A1* | 2/2016 | Hsu | | G06F 9/3887 712/22 |
| 2016/0267621 A1* | 9/2016 | Liao | | G06T 1/20 |
| 2016/0357551 A1* | 12/2016 | Wood | | G06F 9/3004 |
| 2017/0256019 A1* | 9/2017 | Vembu | | G06T 1/20 |
| 2017/0315847 A1* | 11/2017 | Chen | | G06F 9/5044 |
| 2018/0144435 A1* | 5/2018 | Chen | | G06T 1/20 |
| 2018/0165790 A1* | 6/2018 | Schneider | | G06T 1/60 |
| 2018/0293099 A1* | 10/2018 | Clohset | | G06F 9/4881 |

OTHER PUBLICATIONS

Hansen, P. "Structured Multiprogramming", Communications of the ACM, Jul. 1972, pp. 574-578, vol. 15, Issue 7, ACM, New York, NY, USA.

Lampson, B. et al, "Experience with Processes and Monitors in Mesa" Communications of the ACM, Feb. 1980, pp. 105-117, vol. 23, Issue 2, ACM, New York, NY, USA.

* cited by examiner

MONITOR SUPPORT ON ACCELERATED PROCESSING DEVICE

GOVERNMENT LICENSE RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

General purpose graphics processing unit ("GPGPU") computing is a rapidly improving field. With GPGPU, the massively parallel single-instruction-multiple-data ("SIMD") computing capabilities originally developed for calculating vertex positions and pixel colors are co-opted for other tasks that benefit from SIMD-style processing. In many instances, with GPGPU, the graphics processing pipeline (which performs traditional graphics rendering) is bypassed, although GPGPU can also be used in conjunction with the graphics processing pipeline. Although powerful, GPGPU does not have the full versatility of traditional central processing unit ("CPU") execution. For this reason, improvements are constantly being made to GPGPU-style processing devices.

BRIEF DESCRIPTION OF THE DRAWINGS

A more detailed understanding can be had from the following description, given by way of example in conjunction with the accompanying drawings wherein.

DETAILED DESCRIPTION

A technique for implementing synchronization monitors on an accelerated processing device ("APD") is provided. According to the technique, a monitor coordinator is provided to facilitate monitor operation for workgroups executing on an APD. By way of background, work on an APD includes workgroups that include one or more wavefronts. All wavefronts of a workgroup execute on a single compute unit. Also by way of background, a monitor is a synchronization construct that allows threads (workgroups) to stall until a particular condition is met.

To facilitate the monitors, a monitor coordinator tracks workgroups that have started to wait on a condition through a series of states. Specifically, responsive to all wavefronts of a workgroup executing a wait instruction, the monitor coordinator records the workgroup in an "entry queue." The workgroup begins saving its state to a general APD memory and, when such saving is complete, the monitor coordinator moves the workgroup to a "condition queue." In some implementations, the monitor coordinator moves the workgroup to a condition queue before saving of state is complete—i.e., when saving of state begins or even before the state saving begins. In such a situation, it is possible for a workgroup to both be in the entry queue and in the condition queue. More specifically, the workgroup would enter both the entry queue and the condition queue upon the wait instruction being executed, and then would leave the entry queue when state save has completed. When the condition specified by the wait instruction is met, the monitor coordinator moves the workgroup to a "ready queue," and, when sufficient resources are available on a compute unit, the APD schedules the ready workgroup for execution on a compute unit. Additional details are provided herein.

Figure 1:
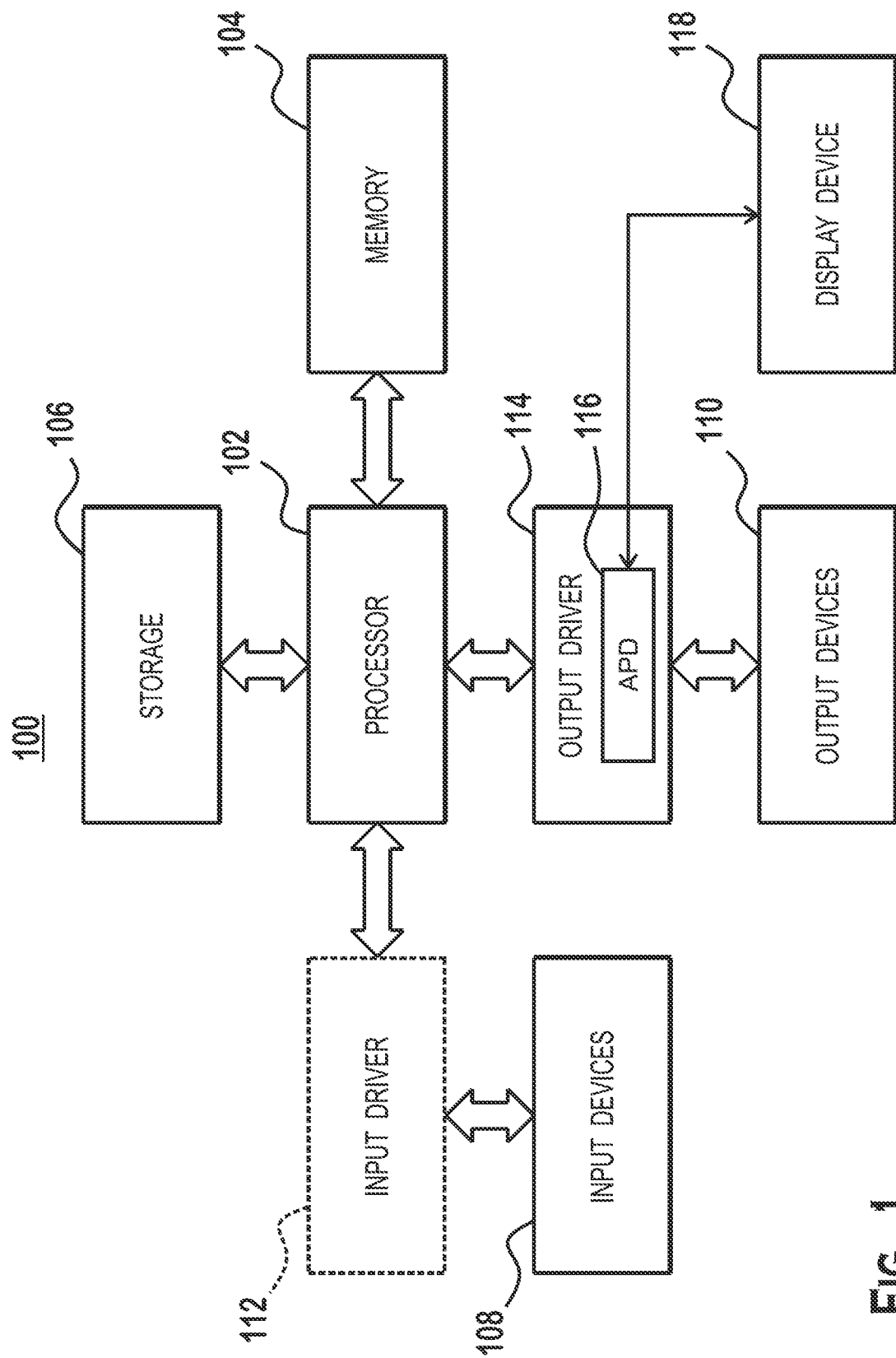
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102 (which may also be referred to as a "host processor"), a memory 104, a storage 106, one or more input devices 108, and one or more output devices 110. The device 100 also optionally includes an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core is one of a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
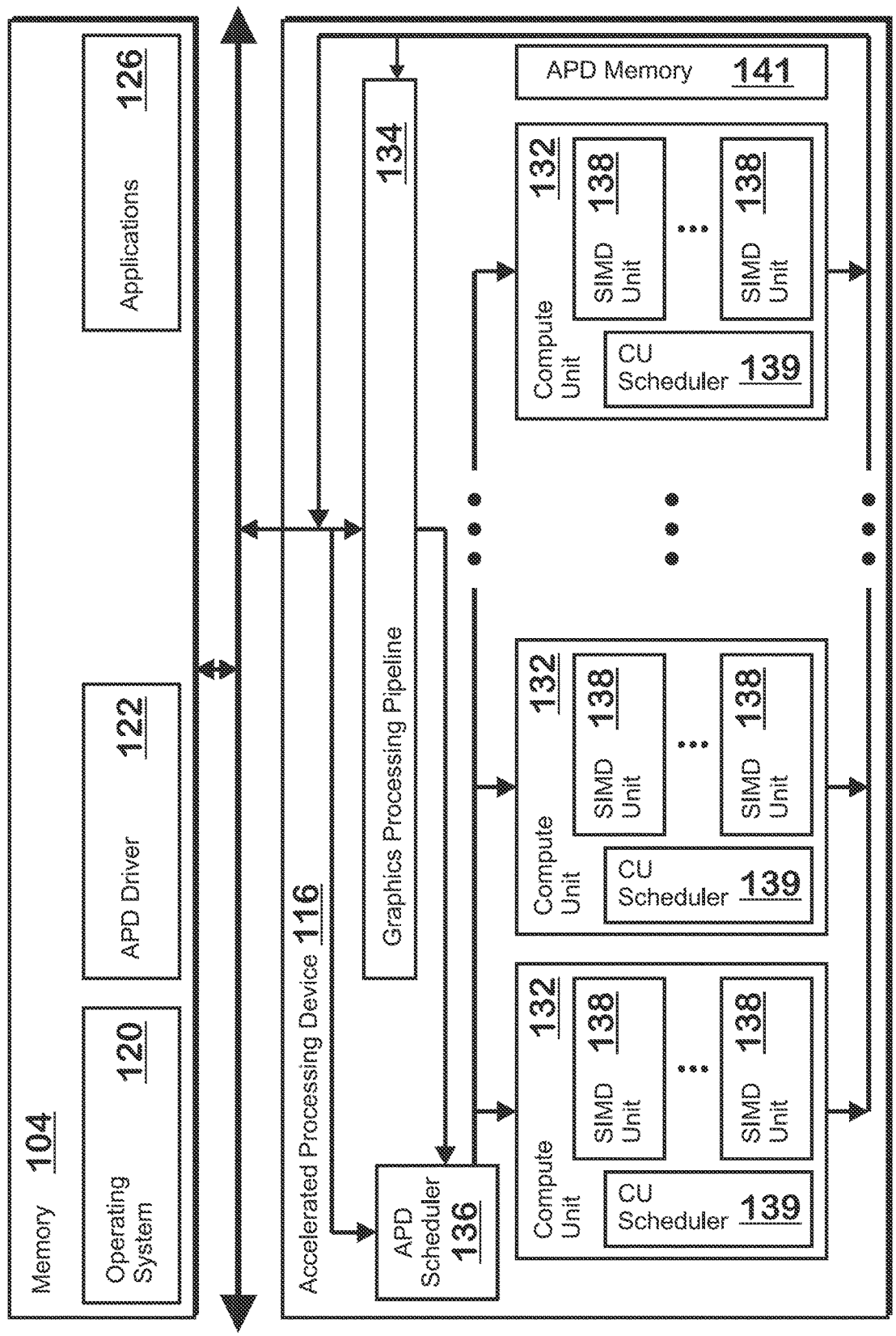
FIG. 2 illustrates details of the device and the APD, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes APD memory 141, available generally to components of the APD 116, as well as compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Notifications that new work is ready to be performed on the APD 116 are made via a doorbell mechanism. More specifically, to notify the APD 116 that new work is ready, an entity (such as the processor 102) writes a doorbell into a doorbell memory. The doorbell includes a pointer into a command buffer that indicates the memory address of commands to be fetched and processed.

In one implementation, the doorbell includes the address of the head of a circular buffer. The address of the tail is maintained separately by the APD 116. When the head and tail pointers are equal, no new commands are available to be fetched. When an entity writes a doorbell including a head that is greater than the tail pointer, the commands to be fetched are found at addresses between the head and the tail. The APD 116 consumes the commands in the command buffer, adjusting the tail pointer as commands are fetched. When the head and tail pointers are again equal, no new commands are available in the command buffer. In this implementation, the doorbell serves both as a notification that work is ready to be performed and as an indication of the memory address at which commands are to be found. Optionally, doorbells written into the doorbell memory 214 are marked as processed when work indicated by that doorbell is complete or when a newer doorbell is written into the doorbell memory 214. In other implementations, the doorbell may serve only as an indication that work is ready to be fetched and executed, with indications of the locations of that work being determined separately from the value provided by the doorbell. In yet other implementations, the doorbell may serve any alternative or additional purpose.

Figure 3:
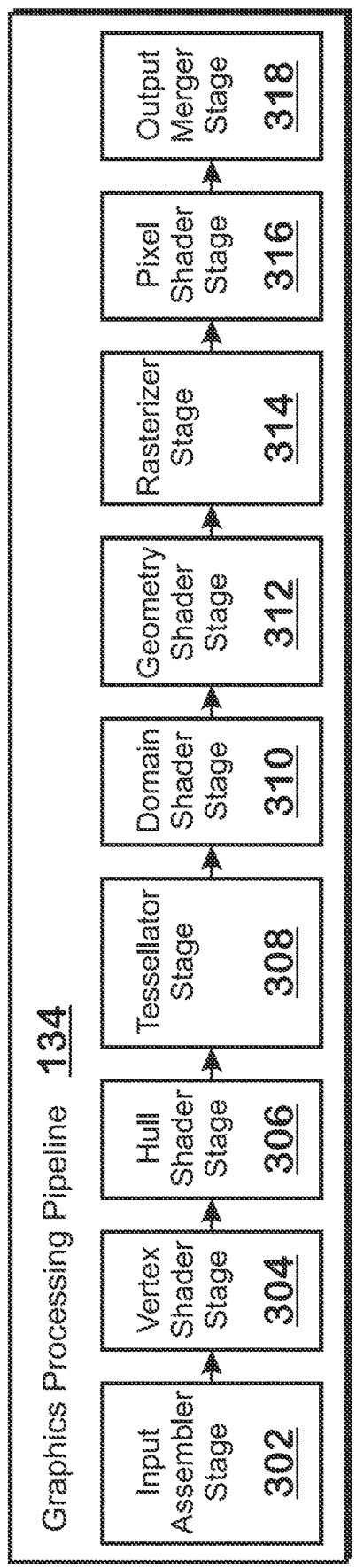
FIG. 3 is a block diagram showing additional details of the graphics processing pipeline illustrated in FIG. 2, according to an example.

FIG. 3 is a block diagram showing additional details of the graphics processing pipeline 134 illustrated in FIG. 2, according to an example. The graphics processing pipeline 134 includes stages that each performs specific functionality. The stages represent subdivisions of functionality of the graphics processing pipeline 134. Each stage is implemented partially or fully as shader programs executing in the compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the compute units 132 perform operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the compute units 132.

The output merger stage 318 accepts output from the pixel shader stage 316 and merges those outputs, performing operations such as z-testing and alpha blending to determine the final color for a screen pixel.

Figure 4:
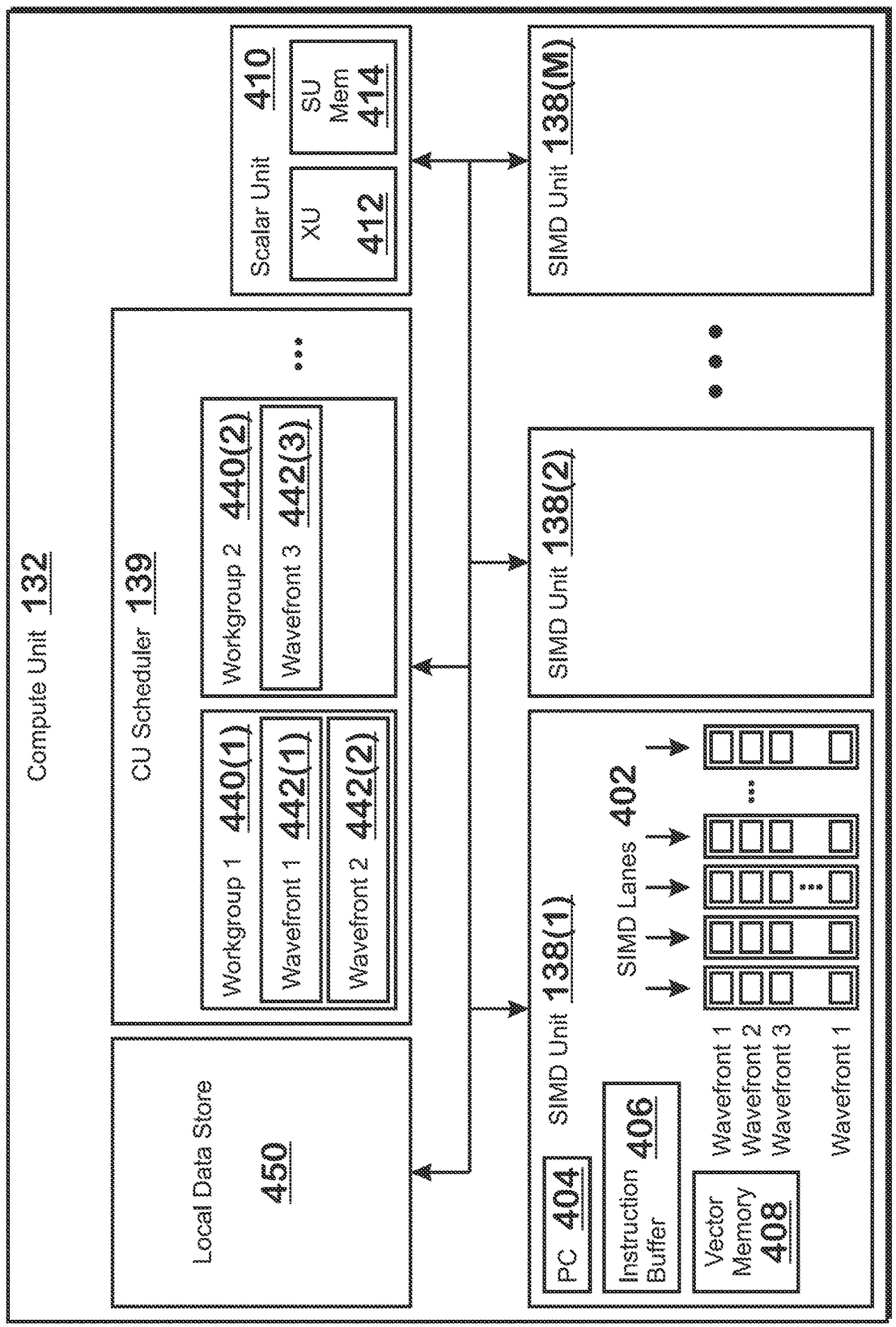
FIG. 4 illustrates additional detail related to execution on compute units, according to an example.

FIG. 4 illustrates additional detail related to execution on compute units 132, according to an example. Because FIG. 4 shows additional detail as compared with FIG. 2, several elements of the compute unit 132 are illustrated in FIG. 4 that are not illustrated in FIG. 2. The compute unit 132 includes a compute unit scheduler 139, one or more SIMD units 138, a scalar unit 410, and a local data store 450.

As described above, an entity such as the processor 102 (e.g., as directed by an application 126) or the APD 116 itself requests programs to be executed on the compute units 132. To execute such a program on the APD 116, the APD scheduler 136 determines how many work-items the program is to be performed for and generates one or more workgroups for distribution to the compute units 132. Each workgroup is assigned to one particular compute unit 132. The APD scheduler 136 assigns workgroups to compute units 132 based on various factors such as resource availability, load balancing, and potentially other factors. When a workgroup is assigned to a compute unit 132, a particular amount of resources of the compute unit 132 are consumed.

The CU scheduler 139 manages workgroups 430 that have been assigned to the compute unit 132 by the APD scheduler 136. Specifically, the CU scheduler 139 breaks workgroups 440 up into wavefronts 442 and schedules the wavefronts 442 for execution on individual SIMD units 138. When a wavefront 442 is scheduled on a SIMD unit 138, a particular amount of resources on the SIMD unit 138 are consumed. Vector instructions—that is, instructions that execute on multiple items of data—are executed within SIMD units 138 and scalar instructions—instructions for which one items of data is processed, or special instructions that are only executed once for each work item, such as branch instructions—are executed in the scalar unit 410.

Within the SIMD units 138, different wavefronts 442 are given turns on the hardware. In some examples, instructions for individual wavefronts 442 are interleaved to allow multiple wavefronts 442 to execute concurrently in a SIMD unit 138. In FIG. 4, this type of interleaved execution is shown on SIMD unit 138(1). More specifically, SIMD unit 138(1) illustrates several SIMD lanes 402. The small squares illustrated in each of the SIMD lanes 402 represent one work-item executing one instruction. The sequence of wavefronts 442 illustrated represents an example order of execution of individual instructions for each wavefronts 442. Thus in the example illustrated, an instruction from wavefront 1 is executed, followed by an instruction from wavefront 2, followed by an instruction from wavefront 3. At some later point, an instruction from wavefront 1 is executed. Any sequence of wavefronts may be used for executing wavefronts—the particular round robin sequence illustrated is just an example. Note that this type of "interleaved" instruction execution allows for more a number of wavefronts greater than the number of SIMD units 138 within a compute unit 132 to execute concurrently.

In the compute unit 132, the local data store 450 stores data for use by workgroups 440 and wavefronts 442. In some examples, the local data store 450 is used for communications between SIMD units 138. The SIMD units 138 include vector memory 408, which, in various examples, include cache type memory, register files, and the like, that has lower latency than the local data store 450. In various examples, the scalar unit 410 also includes its own scalar unit ("SU") memory 414 that acts as a cache and/or includes register files. Vector memory 408 is accessible to the SIMD unit 138 in which it resides, but not to other SIMD units 138.

The compute units 132 also include a program counter ("PC"), which stores the address of the currently executing instruction and an instruction buffer 406, which stores instructions for wavefronts 442 scheduled to the SIMD unit 138. The compute units 132 also include various other elements not illustrated, examples of which include instruction fetch units, arithmetic logic units ("ALUs"), and other logic and memory not illustrated. The scalar unit 410 is shown as including an execution unit ("XU") 412, in addition to the SU memory 414, but also includes various other components not shown, such as instruction fetch units and other logic and memory not illustrated.

Note, various components are shown in FIG. 4 for only one of the SIMD units 138 for clarity, but it should be understood that each of the SIMD units 138 includes one or more (or all) of the components illustrated in SIMD unit 138(1).

In general execution, once a workgroup 440 has been scheduled to a compute unit 132, that workgroup 440 remains on that compute unit 132 until all wavefronts 442 of that workgroup 440 have completed execution. A workgroup 440 may "stall" for some reason, such as due to an unsatisfied dependency or for another reason. However, even in such situations, workgroups 440 that stall are not "evicted" from a compute unit 132 but are instead effectively put to "sleep." The term "evict" in this context means that the workgroup 440 is "removed" from the compute unit 132, which includes removing data, instructions, and scheduling information for the workgroup 440 from the compute unit 132 and copying that data and instructions to a more global memory such as APD memory 141 (FIG. 2) so that the workgroup 440 could be re-assigned to the same or a different compute unit 132. The term "put to sleep" means that execution for the workgroup 440 is frozen until some condition is satisfied (such as dependency data being available). When put to sleep, resources, such as space in the local data store 450, CU scheduler 139, and the like, are still reserved, but instructions for the workgroup 430 are not scheduled for execution on SIMD units 138 or the scalar unit 410 until the workgroup 440 is no longer asleep.

The eviction of workgroups 440 from a compute unit 132 and scheduling of other workgroups 440 to that compute unit is not performed for general-purpose concurrent execution. This is because evicting a workgroup 440 from a compute unit 132 is a time-intensive operation, as there is a significant amount of data that is to be copied out for each workgroup 440 to be evicted. Instead, concurrent execution is provided by the interleaving of instructions from different wavefronts 442 in SIMD units 138 described above. Note that in general, while memory-type resources (e.g., the vector memory 408) may be reserved by stalled workgroups 440, concurrent execution is still efficient in that stalled workgroups do not result in empty execution time-slots on SIMD units 138. For example, in a round-robin wavefront execution paradigm, a wavefront 442 that is part of a stalled workgroup 440 would not get a turn in the round-robin scheme, rather than being wasteful by consuming an unused clock cycle. Thus, processing time-based performance does not suffer to a large degree when a workgroup 440 stalls.

Nevertheless, there are situations in which it is desirable for workgroups 440 to be evicted to make "room" for other workgroups 440 to be scheduled. In one example, it is possible for work to deadlock on an APD 116. For example, if a first set of workgroups 440 is large enough to consume all of the resources of all compute units 132 but the first set of workgroups 440 is dependent on execution of a later, second set of workgroups 440, then the APD 116 would deadlock without being able to evict the first set of workgroups 440.

One concurrent execution paradigm which could result in the above mentioned deadlock if the ability to evict workgroups 440 were not present is the concurrency monitors paradigm. Under the concurrency monitors paradigm as generally stated, a first thread of execution executes a wait command which specifies a condition upon which the wait is predicated. The first thread stalls until the condition is satisfied. A second thread executes and triggers the condition, after which the first thread resumes. The monitor paradigm may also involve a thread-safe variable or object that is accessed in a mutually-exclusive manner by the two threads. Two different semantic paradigms are possible: the stricter Hoare semantics, in which the signaling thread is pre-empted to allow the waiting thread, which just had its condition satisfied by the signaler, to continue execution, and the less strict Hansen semantics, in which the signaling thread is allowed to continue execution while the waiting thread, which had its condition satisfied by the signaler, will be restarted once resources are released. According to the Hansen semantics, because the signaling thread is not pre-empted, the condition that was satisfied by the signaling thread may not be satisfied once the waiting thread restarts, which may therefore need to check whether the condition is still satisfied once that thread restarts.

Figure 5:
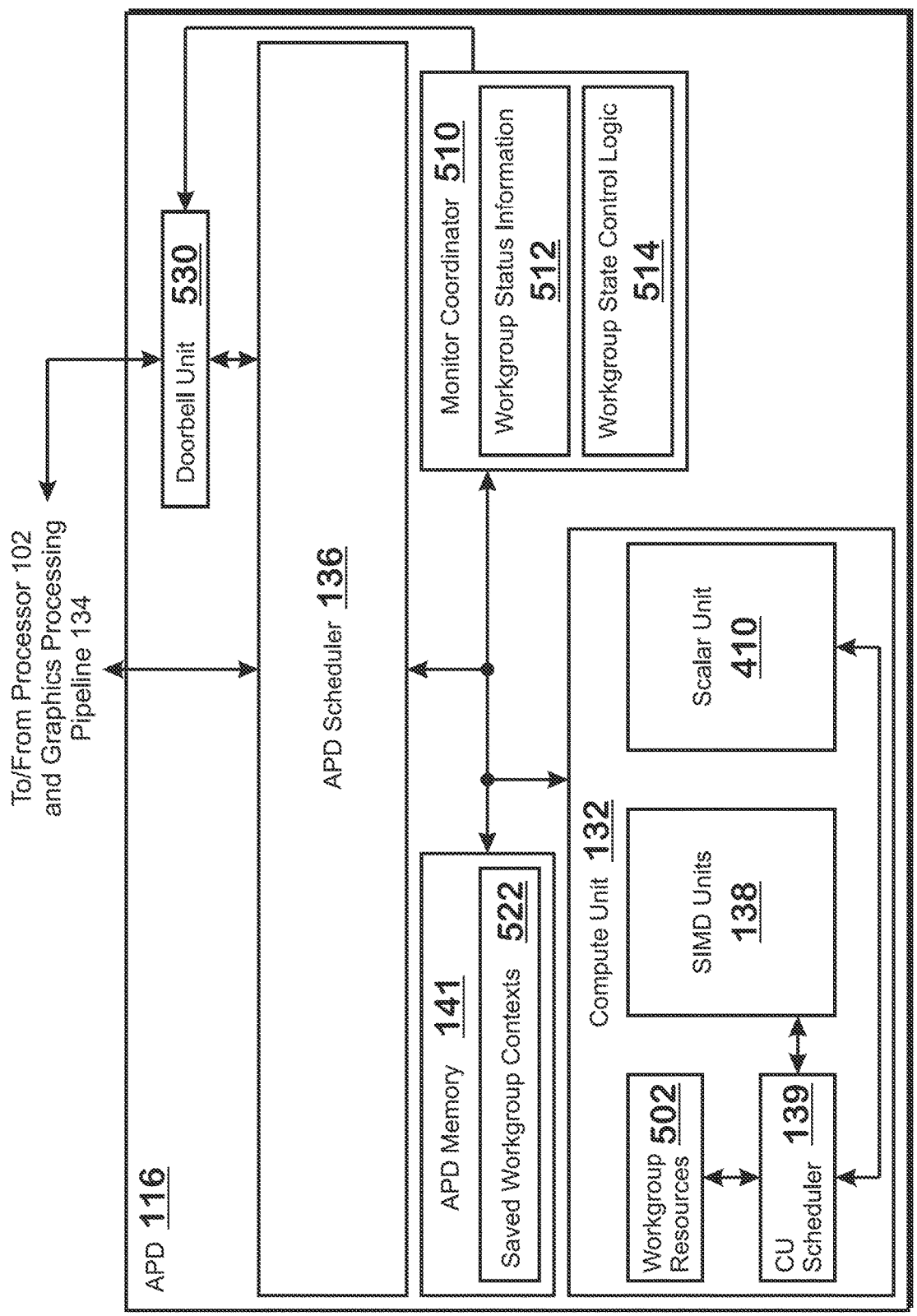
FIG. 5 is a block diagram illustrating details of the APD related to the hardware-supported monitors, according to an example.

Because deadlocks are possible without the ability to evict workgroups 440 with dependencies from compute units 132, and because monitors are a commonly-used mechanism that involves such dependencies, a hardware-supported technique for handling concurrency monitors is provided herein. FIG. 5 is a block diagram illustrating details of the APD 116 related to the hardware-supported monitors, according to an example. FIG. 5 illustrates some of the elements illustrated in other figures and also illustrates additional elements. Specifically, FIG. 5 illustrates a monitor coordinator 510 and a doorbell unit 530. In addition, saved workgroup contexts 522 are illustrated in the APD memory 141 and workgroup resources 502 are illustrated in the compute unit. The monitor coordinator 510 includes workgroup status information 512 and workgroup state control logic 514. In some implementations, the monitor coordinator 510 is considered to be different than the compute units 132 in that the monitor coordinator 510 includes hardware dedicated to the purpose of facilitating hardware monitors. The monitor coordinator 510 is not required to include SIMD units and generally includes fixed-function hardware such as a state machine or a microcontroller programmed with firmware configured to perform the functions described herein. Note that it is alternatively possible for the monitor coordinator 510 to be implemented as software on some sort of SIMD-based execution unit such as one of the SIMD units 138 or some other execution unit that is SIMD-based and not otherwise described herein.

The doorbell unit 530 implements a doorbell mechanism, which is a mechanism by which the APD scheduler 136 is informed that new work is ready to be performed. According to the doorbell mechanism, a doorbell is "rung" to notify the APD 116 of new work. The doorbell unit 530 supports multiple doorbells, and is able to access (e.g., retrieve work from, examine, or the like) each doorbell individually. In one example, doorbells are accessed by writing to an address in system memory, with appropriate memory mapping, address translation, and routing fabric used to forward such writes to the doorbell unit 530 and the specific doorbell accessed. In one illustrative example, an application 126 executing on the processor 102 writes to an address associated with a doorbell. Memory mapping tables managed by the operating system 120 indicate that the address is associated with a peripheral component interconnect express (PCIe) device and forwards the memory write to the PCIe fabric for routing to the appropriate device. The PCIe fabric routes the memory write to the appropriate device—the APD 116, and the APD 116 examines the address of the write to determine that the memory write is a write to the doorbell. The APD 116 then forwards at least a portion of the memory write to the doorbell unit 530 for further processing. Typically, the memory write writes a value into a register or the like, which indicates what work is to be performed. In one example, the value is a head pointer that points to the head of a command queue that stores work for execution on the APD 116. In response to receiving the doorbell, the doorbell unit 530 fetches commands pointed to by the doorbell value and causes those commands to be executed on the APD 116.

The workgroup resources 502 represent whatever resources on a compute unit 132 are consumed by a workgroup 440. These resources generally include memory resources (e.g., at least a portion of the local data store 450, vector memory 408, the instruction buffer 406, and scalar unit memory 414, as well as other memory resources) and various counters, state data, and other information stored in the compute unit 132 used for tracking execution of a workgroup 440.

The monitor coordinator 510 supports a monitor mechanism for workgroups 440 on the APD 116. As described above, a monitor is a mechanism whereby a first thread—which equates to a workgroup 440 on the APD 116—stalls and waits for a second thread—again, a workgroup 440 on the APD 116—to satisfy a condition before resuming. The monitor coordinator includes workgroup status information 512 and workgroup state control logic 514. The workgroup status information 512 stores information that monitors the status of workgroups 440 that are considered to be participating in a monitor. A workgroup 440 is considered to be participating in a monitor when all wavefronts 442 of a workgroup 440 have executed a special instruction called a "wait instruction" that causes the workgroup 440 to be evicted from a compute unit 132 until a condition specified by the wait instruction is met. A workgroup 440 is no longer considered to be participating in a monitor when the condition upon which the workgroup 440 is waiting is met and the workgroup 440 has been re-scheduled for execution on a compute unit 132. The workgroup status information 512 keeps track of such status and the workgroup state control logic 514 manages transitions between the various states.

One example of a mechanism by which the monitor coordinator 510 learns that a condition is met is through the use of doorbells and the doorbell unit 530. More specifically, in this example, when a workgroup 440 executes a wait instruction, the wait instruction includes the address of the condition variable as well as the value or condition expected. In response the monitor coordinator 510 registers a doorbell with the doorbell unit 530 so that when a value is written to the address of the condition value, the doorbell unit 530 notifies the monitor coordinator 510 that such a value has been written. The monitor coordinator 510 then checks the value written to the doorbell against the value or condition expected and wakes the associated workgroup 440 if the condition is met. Note that in this situation, the doorbell unit 530 is not used exactly as described above. More specifically, in "typical" use, the doorbell unit 530 is used to inform a part of the APD 116 that work is ready to be performed.

In such a situation, the value written to the address associated with the doorbell is the address of a head pointer of a command buffer. By contrast, for the monitor mechanism, the doorbell mechanism is used as a way to be notified when a particular address is written to. In other words, the doorbell mechanism that exists in the APD 116 for the purpose of notifying when work is ready is used for a different purpose—monitoring particular memory addresses to determine when a condition is met. Note also that, upon receiving notification via the doorbell unit 530 that the memory address specified in a wait instruction was written to, the workgroup 440 that executes the wait instruction is not re-scheduled to check the value written against the value or condition specified by the wait instruction—such an operation would be inefficient. Instead, the monitor coordinator 510 itself is the entity that checks the value written against the value or condition specified by the wait instruction. This is part of the hardware acceleration contributed by the monitor coordinator 510. Note, this is different than how monitors are typically implemented on a CPU, as with a CPU, a waiting thread is re-scheduled and checks the monitor condition itself. For reasons described above, this "CPU-like" operation would be inefficient on the APD 116 and so the monitor coordinator 510 is provided to perform this operation.

The monitor coordinator 510 implements Hansen monitor semantics, which means that the signaling workgroup is allowed to continue execution while the waiting workgroup, which had its condition satisfied by the signaler, will be restarted once resources are released. According to the Hansen semantics, because the signaling workgroup is not pre-empted, the condition that was satisfied by the signaling workgroup may not be satisfied once the waiting workgroup restarts, which may therefore need to check whether the condition is still satisfied once that workgroup restarts.

Figure 6:
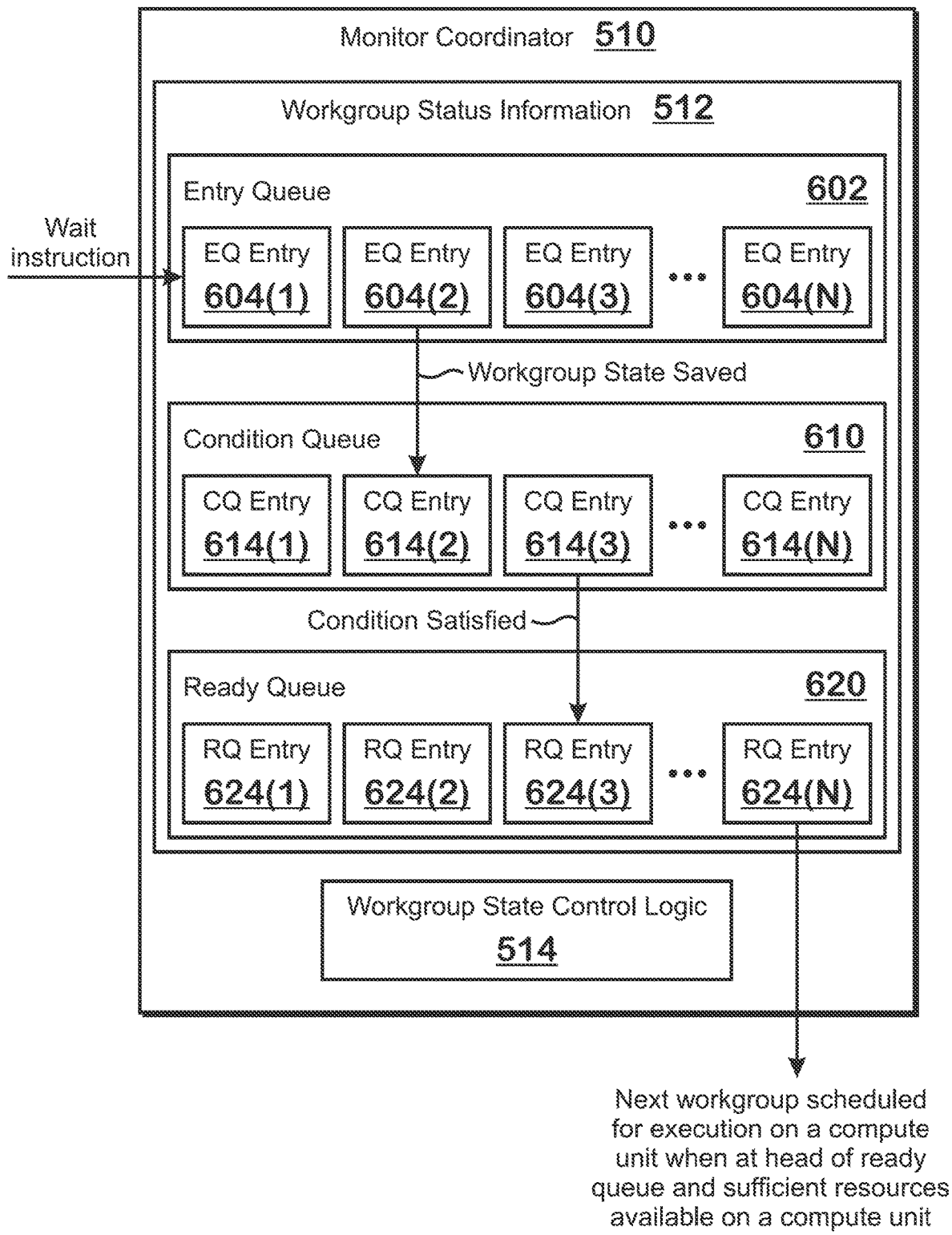
FIG. 6 is a block diagram illustrating details of the workgroup status information of the monitor coordinator, according to an example.

FIG. 6 is a block diagram illustrating details of the workgroup status information 512 of the monitor coordinator 510, according to an example. The workgroup status information 512 includes one or more entry queues ("EQs") 602, which store one or more EQ entries 604, one or more condition queues ("CQs") 610, which store one or more CQ entries, and one or more ready queues ("RQs") 620, which store RQ entries.

When all wavefronts 442 of a workgroup 440 execute a work instruction, that workgroup 440 begins backing up workgroup resources 502 for that workgroup to the APD memory 141 to the waved workgroup contexts 522 and the workgroup state control logic 514 enters the workgroup 440 into an entry queue 602. When backup is complete, the workgroup state control logic 514 moves the workgroup 440 to a condition queue 610. In some implementations, the monitor coordinator moves the workgroup to a condition queue before saving of state is complete—i.e., when saving of state begins or even before the state saving begins. In such a situation, it is possible for a workgroup to both be in the entry queue and in the condition queue. More specifically, the workgroup would enter both the entry queue and the condition queue upon the wait instruction being executed, and then would leave the entry queue when state save has completed. When the condition is satisfied, the workgroup state control logic 514 moves the workgroup 440 to the ready queue 620. When the workgroup 440 is at the head of the ready queue 620, the monitor coordinator 510 requests that the APD scheduler 136 schedule the workgroup to a compute unit 132. The APD scheduler 136 schedules the workgroup 440 to a compute unit 132 in accordance with any technically feasible technique. Herein, moving a workgroup 440 from one queue to another means creating an appropriate entry in the destination queue that identifies that workgroup and removing the corresponding entry from the source queue.

Figure 7:
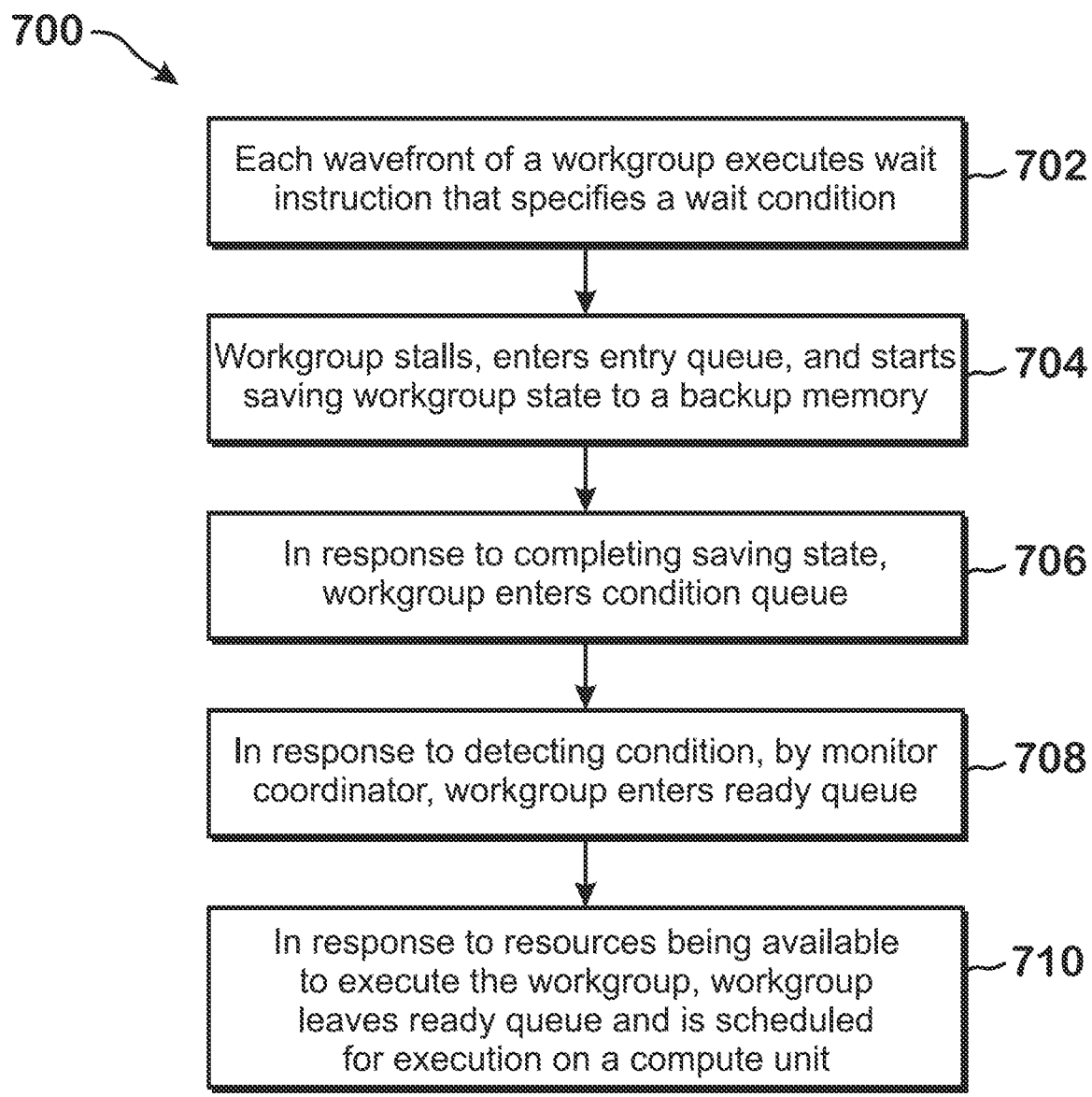
FIG. 7 is a flow diagram of a method for coordinating synchronization monitors for workgroups executing on an accelerated processing device, according to an example.

FIG. 7 is a flow diagram of a method 700 for coordinating synchronization monitors for workgroups executing on an accelerated processing device, according to an example. Although described in the context of the system of FIGS. 1-6, it should be understood that any system performing the steps of FIG. 7 in various technically feasible orders, falls within the scope of the present disclosure.

The method 700 begins at step 702, where each wavefront in a workgroup 440 executing on a particular compute unit 132 executes a wait instruction. The wait instruction specifies a wait condition which is the condition to be met for the waiting workgroup to resume. The wait condition specifies a particular address at which a variable associated with the wait condition resides.

In some examples, responsive to all wavefronts 442 in a workgroup 440 executing the wait instruction, the monitor coordinator 510 acquires a lock for the workgroup 440, the lock being specified by the wait instruction. The lock is associated with the memory address, which is also specified by the wait instruction, and which is the memory address of the condition variable (i.e., the value checked to determine whether the condition is satisfied). The purpose of the lock is to prevent the data race that would occur between the workgroup 440 waiting and another workgroup 440 that would satisfy the condition. The duration of the lock is from when it is detected that all wavefronts 442 of the workgroup 440 execute the wait instruction to when the workgroup 440 is in the entry queue 604. The lock serves to prevent a data race that would cause a determination that the condition has been met to be lost. More specifically, as described above, when all wavefronts 442 of a workgroup 440 execute the wait instruction, the monitor coordinator 510 registers a doorbell with the doorbell unit 530 for the address of the condition variable of the condition to be satisfied. If a write occurs to the condition variable after the wait instructions are executed but before the doorbell is registered, and no lock was taken, then the notification that the condition variable had been written to would never be generated. By taking a lock on the address associated with the condition variable, such a data race is prevented. If the lock is acquired, then any entity attempting to write to the condition variable would be prevented from doing so until the lock is released and the doorbell is registered. If the lock is not acquired, then the monitor coordinator 510 knows that the condition variable is being written to and checks the value of the condition variable against the specified condition, moving the waiting workgroup 440 through the appropriate queues accordingly. The lock also allows the wait instruction to be used inside critical sections, when programmers might wait to wait (pre-empt/yield) inside of a critical section.

At step 704, because the wait instruction is executed for each wavefront of the workgroup, the workgroup stops execution. The monitor coordinator 510 generates an entry queue entry 604 and places the entry queue entry 604 in an entry queue 602. The workgroup begins being backed up to a backup memory such as APD memory 141.

At step 706, the workgroup completes being backed up to the backup memory and, in response, a condition queue entry 614 is generated and placed into a condition queue 610. In some implementations, the monitor coordinator moves the workgroup to a condition queue before saving of state is complete—i.e., when saving of state begins or even before the state saving begins. In such a situation, it is possible for a workgroup to both be in the entry queue and in the condition queue. More specifically, the workgroup would enter both the entry queue and the condition queue upon the wait instruction being executed, and then would leave the entry queue when state save has completed. At step 708, the monitor coordinator 510 detects that the condition has been satisfied, generates a ready queue entry 624 corresponding to the workgroup 440, and places the ready queue entry 624 into the ready queue 620. In one example, the monitor coordinator 510 detects that the condition has been satisfied with the use of doorbells. More specifically, a doorbell is registered for the memory address associated with the condition specified by the wait instruction. When that memory address is written to, the doorbell unit 530 informs the monitor coordinator 510 of such memory access. In response, the monitor coordinator 510 checks the value written against the condition specified by the wait instruction. If the condition is met, then the monitor coordinator 510 detects that the condition has been satisfied (step 708). If the monitor coordinator 510 determines that the condition is not met, then step 708 does not yet occur—the condition has not been satisfied. In step 708, in response to the condition being satisfied, the workgroup enters the ready queue 620 (the monitor coordinator 510 generates a ready queue entry 624 corresponding to the workgroup 440 for which the condition has been satisfied and places the ready queue entry 624 into the ready queue 620.

At step 710, in response to the workgroup 440 being in the ready queue 620 and in response to resources being available on a compute unit 132, the workgroup 440 is scheduled for execution on a compute unit 132. The compute unit 132 that is to execute the workgroup 440 does not need to be the same compute unit 132 (although can be the same compute unit 132) that executed the workgroup 440 when all the wavefronts of the workgroup 440 executed the wait instruction. The APD 116 may select any compute unit 132 to execute the workgroup 440 based on any technically feasible scheduling technique.

Any of the "data" or "information" described herein should be understood to be stored in an appropriate memory that can be but is not necessarily physically included within the unit in which the data or information is depicted.

It should be understood that many variations are possible based on the disclosure herein. For example, the monitor coordinator 510 may be implemented in fixed function hardware, such as a state machine that includes logic that checks condition variables upon receiving a doorbell (and other functionality of the monitor cordinator 510), or a microcontroller that performs the same functionality. A hash table can be used to store condition values. More specifically, upon executing the wait instruction, which specifies a condition variable address and a condition, the monitor coordinator 510 enters a hash table entry that associates a hash of the address with the condition value. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for coordinating a synchronization monitor, the method comprising:
   executing a first workgroup on a first compute unit of a plurality of compute units;
   responsive to detecting that all wavefronts of the first workgroup have executed a wait instruction specifying a first condition, initiating state backup for the first workgroup to a backup memory and initiating monitoring for the first workgroup by a monitor coordinator; and
   responsive to detecting, by the monitor coordinator, that the first condition is satisfied, scheduling the first workgroup for execution on a second compute unit of the plurality of compute units, the second compute unit being one of the first compute unit or a compute unit other than the first compute unit of the plurality of compute units.

2. The method of claim 1, wherein:
   monitoring the first workgroup by the monitor coordinator is performed without using single-instruction-multiple-data ("SIMD") processing resources of the plurality of computing units.

3. The method of claim 1, wherein:
   the monitor coordinator comprises one of a state machine configured to monitor the first workgroup or a microcontroller configured to monitor the first workgroup.

4. The method of claim 1 wherein initiating monitoring for the first workgroup comprises:
   creating a first entry queue entry for the first workgroup and placing the first entry queue entry into an entry queue.

5. The method of claim 1, further comprising:
   creating a first condition queue entry for the first workgroup and placing the first condition queue entry into a condition queue.

6. The method of claim 1, wherein scheduling the first workgroup for execution on the second compute unit comprises:
   creating a first ready queue entry for the first workgroup;
   placing the first ready queue entry into a ready queue; and
   responsive to resources to execute the first workgroup being available on the second compute unit, causing the first workgroup to execute on the second compute unit and removing the first ready queue entry from the first ready queue.

7. The method of claim 1, wherein detecting that the first condition is satisfied comprises:
   receiving a doorbell signal indicating that a memory address associated with the first condition has been written to; and
   examining the memory address to determine that the value at the memory address meets the first condition.

8. The method of claim 7, wherein the doorbell signal comprises:
   a signal for an address registered with a doorbell unit that is notified when registered addresses are written to.

9. The method of claim 1, wherein initiating state backup for the first workgroup to the backup memory and initiating monitoring for the first workgroup comprises:
   obtaining a lock on a memory address specified for the first condition until an entry queue entry for the first workgoup is created and placed in an entry queue of the monitor coordinator.

10. A system for coordinating a synchronization monitor, the system comprising:
    a plurality of compute units configured to execute a plurality of workgroups including a first workgroup; and
    a monitor coordinator configured to:
    responsive to detecting that all wavefronts of the first workgroup have executed a wait instruction specifying a first condition, initiate state backup for the first workgroup to a backup memory and initiating monitoring for the first workgroup; and
    responsive to detecting, by the monitor coordinator, that the first condition is satisfied, schedule the first workgroup for execution on a second compute unit of the plurality of compute units, the second compute unit being one of the first compute unit or a compute unit other than the first compute unit of the plurality of compute units.

11. The system of claim 10, wherein:
    the monitor coordinator is configured to monitor the first workgroup by the monitor coordinator is performed without using single-instruction-multiple-data ("SIMD") processing resources of the plurality of computing units.

12. The system of claim 10, wherein:
    the monitor coordinator comprises one of a state machine configured to monitor the first workgroup or a microcontroller configured to monitor the first workgroup.

13. The system of claim 10, wherein the monitor coordinator is configured to initiate monitoring for the first workgroup by:
    creating a first entry queue entry for the first workgroup and placing the first entry queue entry into an entry queue.

14. The system of claim 13, wherein the monitor coordinator is further configured to:
    create a first condition queue entry for the first workgroup and placing the first condition queue entry into a condition queue.

15. The system of claim 10, wherein the monitor coordinator is configured to schedule the first workgroup for execution on the second compute unit by:
    creating a first ready queue entry for the first workgroup;
    placing the first ready queue entry into a ready queue; and
    responsive to resources to execute the first workgroup being available on the second compute unit, causing the first workgroup to execute on the second compute unit and removing the first ready queue entry from the first ready queue.

16. The system of claim 10, wherein the monitor coordinator is configured to detect that the first condition is satisfied by:
  receiving a doorbell signal indicating that a memory address associated with the first condition has been written to; and
  examining the memory address to determine that the value at the memory address meets the first condition.

17. The system of claim 16, wherein the doorbell signal comprises:
  a signal for an address registered with a doorbell unit that is notified when registered addresses are written to.

18. The system of claim 10, wherein the monitor coordinator is configured to initiate state backup for the first workgroup to the backup memory and initiate monitoring for the first workgroup by:
  obtaining a lock on a memory address specified for the first condition until an entry queue entry for the first workgroup is created and placed in an entry queue of the monitor coordinator.

19. A non-transitory computer-readable medium storing instructions that, when executed by a processor, cause the processor to coordinate a synchronization monitor by:
  executing a first workgroup on a first compute unit of a plurality of compute units;
  responsive to detecting that all wavefronts of the first workgroup have executed a wait instruction specifying a first condition, initiating state backup for the first workgroup to a backup memory and initiating monitoring for the first workgroup by a monitor coordinator; and
  responsive to detecting, by the monitor coordinator, that the first condition is satisfied, scheduling the first workgroup for execution on a second compute unit of the plurality of compute units, the second compute unit being one of the first compute unit or a compute unit other than the first compute unit of the plurality of compute units.

20. The non-transitory computer-readable medium of claim 19, wherein:
  monitoring the first workgroup by the monitor coordinator is performed without using single-instruction-multiple-data ("SIMD") processing resources of the plurality of computing units.

* * * * *